(12) United States Patent
Iwata et al.

(10) Patent No.: US 9,400,012 B2
(45) Date of Patent: Jul. 26, 2016

(54) BEARING STRUCTURE OF TURBOCHARGER

(75) Inventors: Hiromu Iwata, Kariya (JP); Tsuyoshi Uesugi, Kariya (JP)

(73) Assignees: KABUSHIKI KAISHA TOYOTA JIDOSHOKKI, Aichi-ken (JP); TOYOTA JIDOSHA KABUSHIKI KAISHA, Aichi-ken (JP)

(\*) Notice: Subject to any disclaimer, the term of this patent is extended or adjusted under 35 U.S.C. 154(b) by 851 days.

(21) Appl. No.: 13/445,445

(22) Filed: Apr. 12, 2012

(65) Prior Publication Data

US 2012/0263589 A1    Oct. 18, 2012

(30) Foreign Application Priority Data

Apr. 13, 2011 (JP) ................. 2011-089622

(51) Int. Cl.
*F16C 33/66* (2006.01)
*F16C 33/10* (2006.01)
(Continued)

(52) U.S. Cl.
CPC ............. *F16C 33/1045* (2013.01); *F16C 17/02* (2013.01); *F16C 17/18* (2013.01); *F16C 27/02* (2013.01); *F16C 33/74* (2013.01); *F16C 2360/24* (2013.01)

(58) Field of Classification Search
CPC ..... F01D 25/16; F01D 25/186; F01D 25/166; F16C 17/18; F16C 27/02; F16C 33/74; F16C 2360/24; F16C 33/1045; F05D 2260/98
USPC ........................ 416/244 A, 174, 229, 170.1
See application file for complete search history.

(56) References Cited

U.S. PATENT DOCUMENTS 3,811,741 A * 5/1974 McInerney et al. ........... 384/291
4,396,197 A    8/1983 Shimizu
(Continued)

FOREIGN PATENT DOCUMENTS

CN    101821481 A    9/2010
DE    102006055415 A1    5/2008
(Continued)

OTHER PUBLICATIONS

Chinese Office Action for corresponding CN Patent Application No. 201210103036.3 mailed Jan. 22, 2014.
(Continued)

*Primary Examiner* — Dwayne J White
*Assistant Examiner* — Kayla McCaffrey
(74) *Attorney, Agent, or Firm* — Sughrue Mion, PLLC

(57) ABSTRACT

A turbocharger is provided with a rotor shaft and a semi-floating bearing arranged in a bearing chamber and rotatably supporting the rotor shaft. The semi-floating bearing has a pair of bearing portions located at two longitudinal ends. A region between the pair of bearing portions in an outer peripheral surface of the semi-floating bearing and an inner peripheral surface of the bearing chamber constitute an outside oil feed chamber to supply a lubricant oil to outer peripheral surfaces of the pair of bearing portions. A groove extending in a circumferential direction is formed in the outer peripheral surface of at least one of the bearing portions. An oil feed passage to supply the lubricant oil to the outside oil feed chamber and a discharge passage opposed to the groove and configured to discharge the lubricant oil in the groove downward are formed in the bearing housing.

7 Claims, 9 Drawing Sheets

(51) Int. Cl.
  *F16C 17/02* (2006.01)
  *F16C 27/02* (2006.01)
  *F16C 33/74* (2006.01)
  *F16C 17/18* (2006.01)

(56) References Cited

U.S. PATENT DOCUMENTS

| | | | |
|---|---|---|---|
| 4,474,484 A * | 10/1984 | MacInnes et al. | 384/215 |
| 5,993,173 A | 11/1999 | Koike et al. | |
| 6,017,184 A * | 1/2000 | Aguilar et al. | 415/112 |
| 7,214,037 B2 * | 5/2007 | Mavrosakis | 417/407 |
| 7,753,591 B2 * | 7/2010 | Petitjean et al. | 384/397 |
| 2007/0110351 A1 | 5/2007 | Larue | |
| 2010/0196148 A1 | 8/2010 | Gee et al. | |

FOREIGN PATENT DOCUMENTS

| | | |
|---|---|---|
| EP | 0 781 908 A2 | 7/1997 |
| JP | 50135813 | 11/1975 |
| JP | 5787122 U | 5/1982 |
| JP | 9242554 A | 9/1997 |
| JP | 2002-70570 A | 3/2002 |
| JP | 2008-286050 A | 11/2008 |
| JP | 2010-138757 A | 6/2010 |
| WO | 2011058627 A1 | 5/2011 |

OTHER PUBLICATIONS

Extended European Search Report for corresponding EP Patent Application No. 12163895.1 mailed Jul. 19, 2012.

* cited by examiner

BEARING STRUCTURE OF TURBOCHARGER

BACKGROUND OF THE INVENTION

1. Field of the Invention

The present invention relates to a turbocharger.

2. Related Background Art

A conventional turbocharger is one disclosed in Japanese Patent Application Laid-open No. 9-242554 (U.S. Pat. No. 5,993,173 corresponding thereto). This turbocharger is provided with a housing having a bearing housing in which a bearing chamber is formed, a semi-floating bearing arranged in the bearing chamber, and a rotor shaft rotatably supported by the semi-floating bearing. A turbine wheel and a compressor wheel are coupled to the two ends of the rotor shaft.

The semi-floating bearing has a pair of bearing portions formed at the two longitudinal ends, and an intermediate portion connecting the two bearing portions. Formed in each of the two bearing portions are a first outer peripheral surface of a cylindrical shape, and a first inner peripheral surface arranged coaxially with the first outer peripheral surface and rotatably supporting the rotor shaft.

Formed in the bearing housing are an outside oil feed chamber located between the bearing housing and the intermediate portion, a first oil feed passage which can supply a lubricant oil to the outside oil feed chamber, and a second inner peripheral surface supporting each of the first outer peripheral surfaces. Formed in the intermediate portion are an inside oil feed chamber located between the intermediate portion and the rotor shaft, and a second oil feed passage making the outside oil feed chamber communicated with the inside oil feed chamber.

In the bearing chamber, oil drain grooves extending downward are formed in the turbine-wheel-side end face and in the compressor-wheel-side end face, respectively. The upper end of the oil drain groove on the turbine wheel side is opposed to a thrust receiving member arranged to rotate together with the rotor shaft. The upper end of the oil drain groove on the compressor wheel side is opposed to a diameter-increased portion of the rotor shaft.

In this turbocharger, the lubricant oil is supplied through the first oil feed passage and the outside oil feed chamber to the first outer peripheral surfaces of the two bearing portions of the semi-floating bearing and also supplied through the second oil feed passage and the inside oil feed chamber to the first inner peripheral surfaces of the two bearing portions. This configuration allows the semi-floating bearing to rotatably support the rotor shaft well. The lubricant oil supplied to the first outer peripheral surfaces is subjected to supply pressure from the first oil feed passage side, to move toward the turbine wheel and toward the compressor wheel. The moving lubricant oil is guided downward by the oil drain grooves. This improves oil drain performance of this turbocharger.

SUMMARY OF THE INVENTION

In the above-described conventional turbocharger, however, the lubricant oil supplied to the first outer peripheral surfaces is subjected to the supply pressure from the first oil feed passage side and thus likely to be scattered along the rotor shaft. The lubricant oil scattered along the rotor shaft comes into contact with members rotating together with the rotor shaft (e.g., the thrust receiving member, the diameter-increased portion of the rotor shaft, or the like) and is likely to be scattered over a wide range by centrifugal force with rotation thereof. As a result, the scattered lubricant oil can leak through the clearance between the housing and the rotor shaft into the exhaust on the turbine wheel side or into the intake air on the compressor wheel side, with difficulties in improvement of oil-sealing properties.

An object of the present invention is to provide a turbocharger achieving improvement of oil-sealing properties.

An aspect of the present invention is a turbocharger comprising: a housing having a bearing housing in which a bearing chamber is formed; a rotor shaft to which a turbine wheel and a compressor wheel are coupled; and a semi-floating bearing arranged in the bearing chamber and rotatably supporting the rotor shaft, wherein the semi-floating bearing has a pair of bearing portions located at two longitudinal ends, wherein a region between the pair of bearing portions in an outer peripheral surface of the semi-floating bearing and an inner peripheral surface of the bearing chamber constitute an outside oil feed chamber which supplies a lubricant oil to outer peripheral surfaces of the pair of bearing portions, wherein a groove extending in a circumferential direction is formed in the outer peripheral surface of at least one of the bearing portions, and wherein an oil feed passage to supply the lubricant oil to the outside oil feed chamber and a discharge passage opposed to the groove and configured to discharge the lubricant oil in the groove downward are formed in the bearing housing.

In the present invention, the lubricant oil is supplied through the oil feed passage and the outside oil feed chamber to the outer peripheral surfaces of the respective bearing portions of the semi-floating bearing. The lubricant oil supplied to the outer peripheral surfaces is subjected to the supply pressure from the oil feed passage side, to move toward the turbine wheel and toward the compressor wheel. Since the groove extending in the circumferential direction is formed in the outer peripheral surface of at least one of the bearing portions, the lubricant oil supplied to the outer peripheral surface with the groove formed therein flows into the groove. This relieves the supply pressure acting on the lubricant oil. The lubricant oil in the groove moves downward along the groove by gravity. Since the discharge passage opposed to the groove and configured to discharge the lubricant oil in the groove downward is formed in the bearing housing, the lubricant oil moving downward along the groove is guided to the discharge passage to be discharged downward.

In the turbocharger of the present invention, the groove and the discharge passage make the lubricant oil supplied to the outer peripheral surfaces of the bearing portions, less likely to be scattered along the rotor shaft. For this reason, the lubricant oil supplied to the outer peripheral surfaces is prevented from coming into contact with the members rotating together with the rotor shaft and others. Therefore, it is feasible to prevent the lubricant oil supplied to the outer peripheral surfaces from being scattered over a wide range by centrifugal force with rotation of the members rotating together with the rotor shaft and others. As a result, the lubricant oil becomes less likely to leak into the exhaust on the turbine wheel side or into the intake air on the compressor wheel side through the clearance between the housing and the rotor shaft.

Accordingly, the turbocharger of the present invention achieves the improvement of oil-sealing properties.

The discharge passage may be communicated with a lower end of the groove. The groove may be formed so as to extend all the way around the bearing portion in the circumferential direction.

The turbocharger may be configured as follows: the housing has a compartment wall located between the bearing chamber and the turbine wheel, the groove is formed at least in the outer peripheral surface of the bearing portion located on the turbine wheel side, and the discharge passage is formed so that the lubricant oil comes into contact with the compartment wall. In this case, the lubricant oil discharged from the discharge passage comes into contact with the compartment wall on the turbine wheel side which will be raised to high temperature. This configuration allows the compartment wall to be cooled.

The turbocharger may be configured as follows: a region between the pair of bearing portions in an inner peripheral surface of the semi-floating bearing and an outer peripheral surface of the rotor shaft constitute an inside oil feed chamber to supply the lubricant oil to inner peripheral surfaces of the pair of bearing portions, and an oil feed passage to supply the lubricant oil to the inside oil feed chamber is formed in the semi-floating bearing. In this case, the lubricant oil is also supplied through the oil feed passage formed in the semi-floating bearing and through the inside oil feed chamber to the inner peripheral surfaces of the respective bearing portions of the semi-floating bearing.

Another aspect of the present invention is a turbocharger comprising: a housing having a bearing housing in which a bearing chamber is formed; a semi-floating bearing housed in the bearing chamber; and a rotor shaft which is rotatably supported by the semi-floating bearing in the bearing chamber and to which a turbine wheel and a compressor wheel are coupled, wherein the semi-floating bearing has a pair of bearing portions formed at two longitudinal ends and an intermediate portion connecting the two bearing portions, wherein a first outer peripheral surface of a cylindrical shape and a first inner peripheral surface arranged coaxially with the first outer peripheral surface and rotatably supporting the rotor shaft are formed in each of the two bearing portions, wherein an outside oil feed chamber located between the bearing housing and the intermediate portion, a first oil feed passage which can supply a lubricant oil to the outside oil feed chamber, and a second inner peripheral surface supporting the both first outer peripheral surfaces are formed in the bearing housing, wherein an inside oil feed chamber located between the intermediate portion and the rotor shaft, and a second oil feed passage to make the outside oil feed chamber communicated with the inside oil feed chamber are formed in the intermediate portion, wherein a groove extending in a circumferential direction is formed in at least one of the first outer peripheral surfaces, and wherein a discharge passage opposed to the groove and configured to discharge the lubricant oil in the groove downward is formed in the bearing housing.

In the present invention, the lubricant oil is supplied through the first oil feed passage and the outside oil feed chamber to the first outer peripheral surfaces of the both bearing portions of the semi-floating bearing. The lubricant oil supplied to the first outer peripheral surfaces is subjected to the supply pressure from the first oil feed passage side, to move toward the turbine wheel and toward the compressor wheel. Since the groove extending in the circumferential direction is formed in at least one of the first outer peripheral surfaces, the lubricant oil supplied to the first outer peripheral surface with the grooved formed therein flows into the groove. This relieves the supply pressure of the lubricant oil. The lubricant oil in the groove moves downward along the groove by gravity. Since the discharge passage opposed to the groove and configured to discharge the lubricant oil in the groove downward is formed in the bearing housing, the lubricant oil moving downward along the groove is guided to the discharge passage to be discharged downward. The lubricant oil is also supplied through the second oil feed passage and the inside oil feed chamber to the first inner peripheral surfaces of the respective bearing portions of the semi-floating bearing.

In the turbocharger of the present invention, the groove and the discharge passage make the lubricant oil supplied to the first outer peripheral surfaces, less likely to be scattered along the rotor shaft. For this reason, the lubricant oil supplied to the first outer peripheral surfaces is prevented from coming into contact with the members rotating together with the rotor shaft and others. Therefore, it is feasible to prevent the lubricant oil supplied to the first outer peripheral surfaces from being scattered over a wide range by centrifugal force with rotation of the members rotating together with the rotor shaft and others. As a result, the lubricant oil becomes less likely to leak into the exhaust on the turbine wheel side or into the intake air on the compressor wheel side through the clearance between the housing and the rotor shaft.

Accordingly, the turbocharger of the present invention achieves the improvement of oil-sealing properties.

The discharge passage may be communicated with a lower end of the groove. The groove may be formed so as to extend all the way around the bearing portion in the circumferential direction.

The turbocharger may be configured as follows: the housing has a compartment wall located between the bearing chamber and the turbine wheel, the groove is formed at least in the first outer peripheral surface of the bearing portion located on the turbine wheel side, and the discharge passage is formed so that the lubricant oil comes into contact with the compartment wall. In this case the lubricant oil discharged from the discharge passage comes into contact with the compartment wall on the turbine wheel side which will be raised to high temperature. This permits the compartment wall to be cooled.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference signs, without redundant description.

(First Embodiment)

Figure 1:
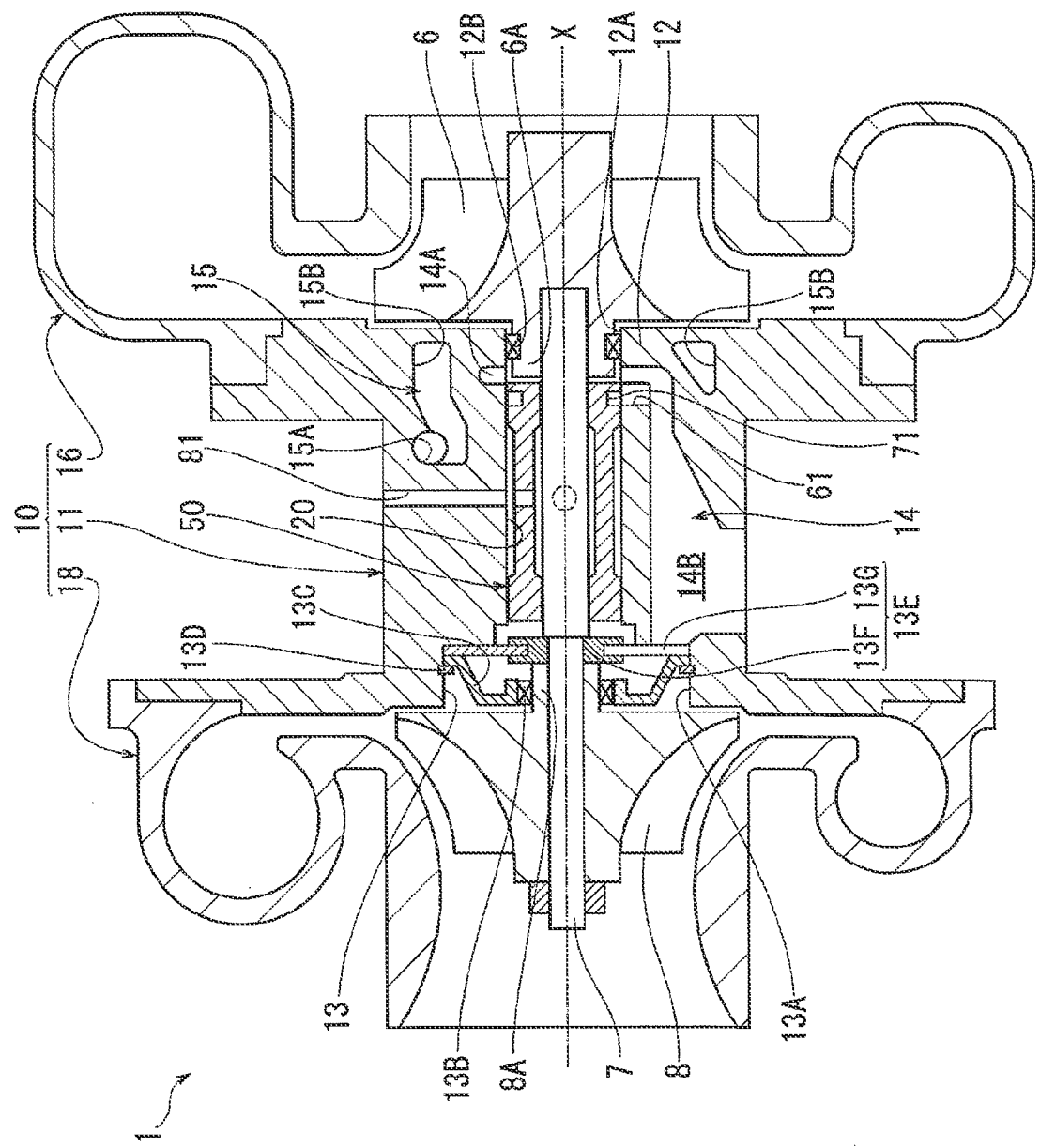
FIG. 1 is a cross-sectional view of a turbocharger according to the first embodiment.

As shown in FIG. 1, a turbocharger 1 of the first embodiment is provided with a housing 10. The housing 10 has a turbine housing 16 housing a turbine wheel 6, a compressor housing 18 housing a compressor wheel 8, and a bearing housing 11. The bearing housing 11 is located between the turbine housing 16 and the compressor housing 18.

Figure 2:
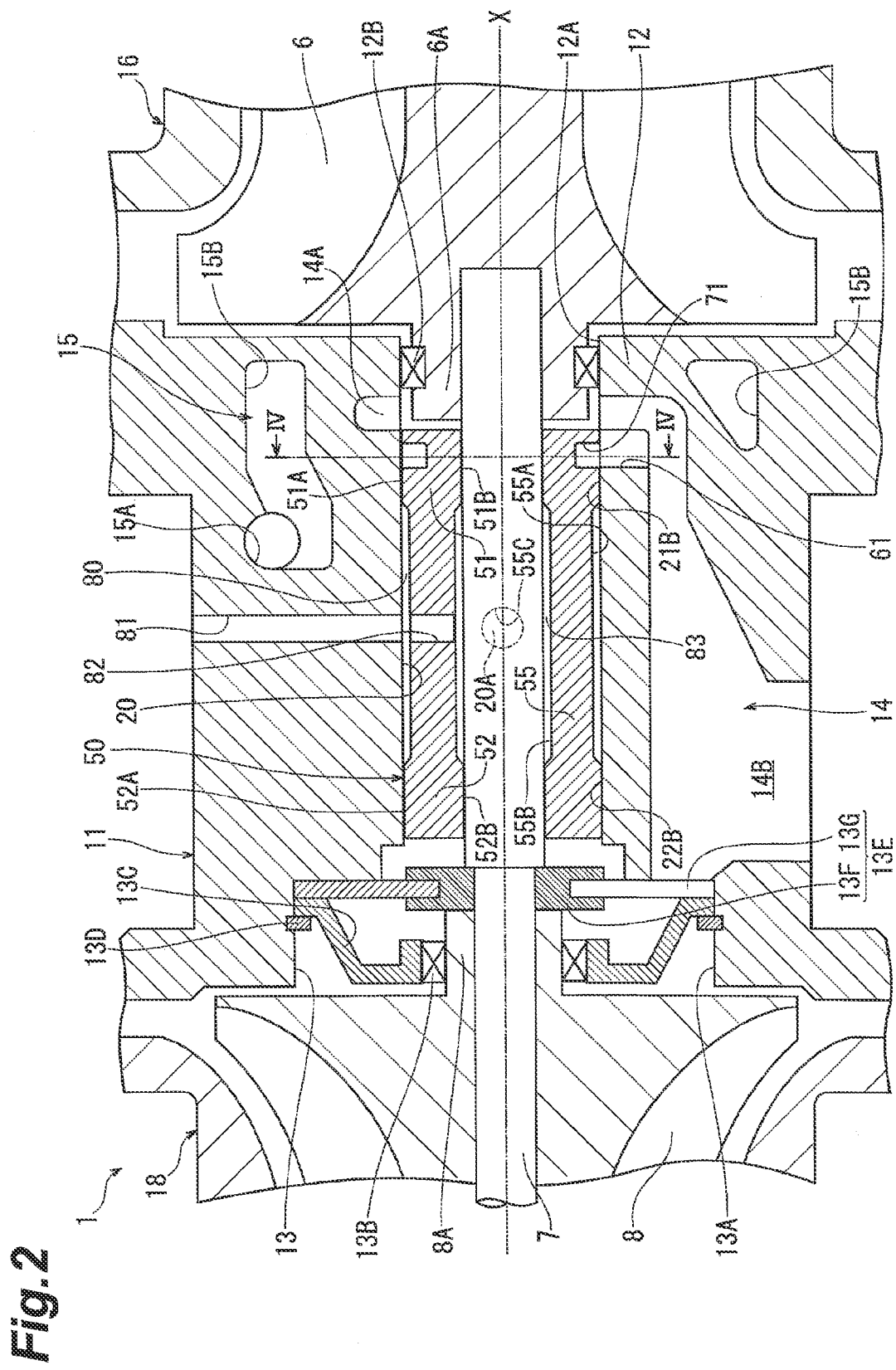
FIG. 2 is an enlarged cross-sectional view of a part of the turbocharger according to the first embodiment.

As shown in FIG. 2, a bearing chamber 20 is formed in the bearing housing 11. The bearing chamber 20 is a cylindrical space with a central axis on a shaft center X. The turbine housing 16 is joined to one side face of the bearing housing 11 in the direction of the shaft center X. The compressor housing 18 is joined to the other side face of the bearing housing 11 in the direction of the shaft center X.

The turbocharger 1 is provided with a semi-floating bearing 50 of a stepped cylinder shape, and a rotor shaft 7 of a cylindrical shaft shape. The semi-floating bearing 50 is arranged in the bearing chamber 20 and housed in the bearing chamber 20. The rotor shaft 7 is rotatably supported around the shaft center X by the semi-floating bearing 50 in the bearing chamber 20. A specific configuration of the semi-floating bearing 50 will be described later.

One end of the rotor shaft 7 extends in the turbine housing 16. The other end of the rotor shaft 7 extends in the compressor housing 18. The turbine wheel 6 is coupled to the one end of the rotor shaft 7. The compressor wheel 8 is coupled to the other end of the rotor shaft 7. The turbine wheel 6, the rotor shaft 7, and the compressor wheel 8 are rotatable together around the shaft center X.

The bearing housing 11 has a compartment wall 12 located between the bearing chamber 20 and the turbine wheel 6. A shaft hole 12A in which a base 6A of the turbine wheel 6 is inserted is formed in the compartment wall 12. Disposed between the shaft hole 12A and the base 6A is a seal member 12B to seal the space between them. The seal member 12B generally employed is a "seal ring," to resist temperature on the turbine wheel 6 side. The "seal ring" used herein is, for example, an O-ring comprised of synthetic rubber or resin, a piston ring of metal, or the like. Since the "seal ring" is well-known, the description thereof is omitted herein.

The bearing housing 11 has a compartment space 13 located between the bearing chamber 20 and the compressor wheel 8. A base 8A of the compressor wheel 8 is inserted in the compartment space 13. A flange member 13C is fixed to an inner peripheral surface 13A of the compartment space 13 by a circlip 13D. The rotor shaft 7 and the base 8A are inserted in the flange member 13C. Disposed between an inner peripheral edge of the flange member 13C and the base 8A is a seal member 13B to seal the space between them. A thrust bearing 13E is disposed on the bearing chamber 20 side with respect to the seal member 13B and the flange member 13C in the compartment space 13. The thrust bearing 13E consists of a rotor member 13F to rotate together with the rotor shaft 7, and a fixed member 13G fixed in the compartment space 13. The thrust bearing 13E positions the rotor shaft 7 in the direction of the shaft center X.

An oil jacket 14 and a water jacket 15 are formed in the bearing housing 11.

The oil jacket 14 consists of a first space 14A and a second space 14B. The first space 14A surrounds a region where the base 6A and the semi-floating bearing 50 are opposed to each other, around the shaft center X. The second space 14B is located below the bearing chamber 20 and extends in the direction of the shaft center X to be connected to the lower end of the first space 14A and to the lower end of the compartment space 13. The second space 14B has an opening in a lower surface of the bearing housing 11 and is connected to an unillustrated oil drain pipe.

The water jacket 15 consists of a penetrating channel 15A and an annular channel 15B. The penetrating channel 15A penetrates the bearing housing 11 from one side face (on the near side with respect to the plane of FIGS. 1 and 2) to the other side face (on the far side with respect to the plane of FIGS. 1 and 2) thereof. The annular channel 15B is located near the compartment wall 12 and surrounds the region where the base 6A and the semi-floating bearing 50 are opposed to each other and the region where the seal member 12B extends, around the shaft center X, from outside the first space 14A. The annular channel 15B is connected to the penetrating channel 15A above the bearing chamber 20.

Figure 3:
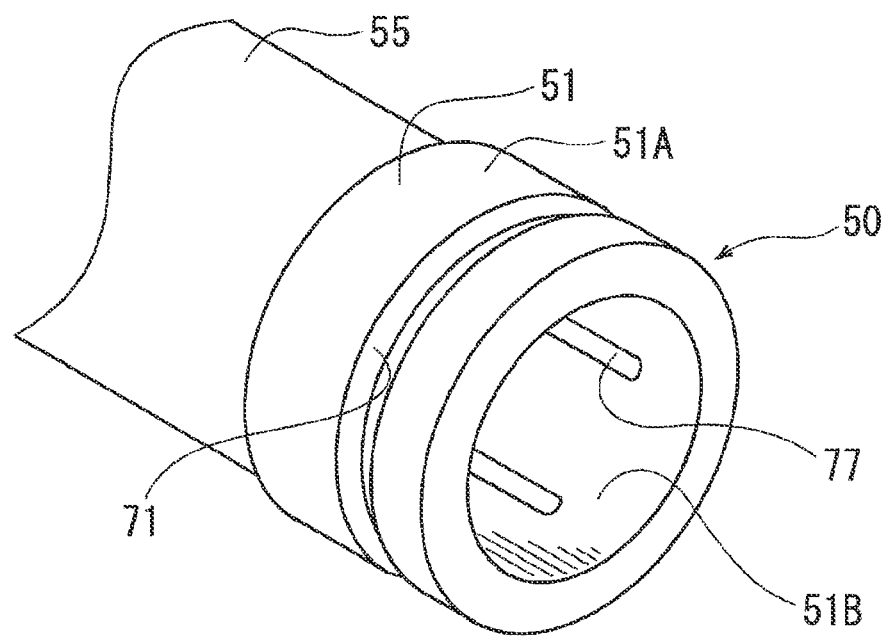
FIG. 3 is a partial perspective view of a semi-floating bearing in the turbocharger according to the first embodiment.

Next, the semi-floating bearing 50 will be described in detail. As shown in FIGS. 2 and 3, the semi-floating bearing 50 has a pair of bearing portions 51, 52 formed at two ends in the longitudinal direction, or in the direction of the shaft center X, and an intermediate portion 55 connecting the bearing portions 51, 52.

Formed in each of the bearing portions 51, 52 are a first outer peripheral surface 51A, 52A of a cylindrical shape and a first inner peripheral surface 51B, 52B of a cylindrical shape coaxial with the first outer peripheral surface 51A, 52A.

Figure 4:
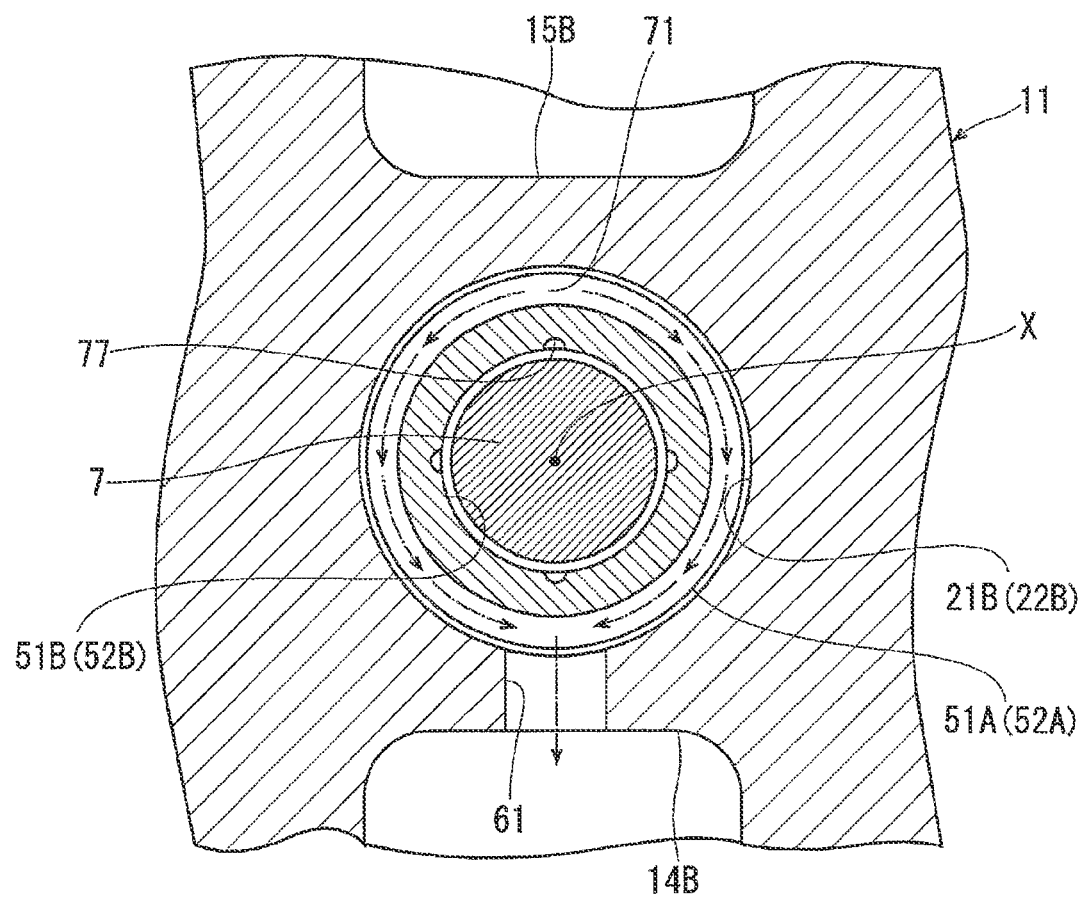
FIG. 4 is a cross-sectional view along the line IV-IV shown in FIG. 2.

The first outer peripheral surfaces 51A, 52A are supported by second inner peripheral surfaces 21B, 22B, respectively, of a cylindrical shape formed at the two ends of the bearing chamber 20 in the direction of the shaft center X. As shown in FIG. 4, the first outer peripheral surfaces 51A, 52A have the diameter slightly smaller than that of the second inner peripheral surfaces 21B, 22B. This allows a lubricant oil film to be formed between the first outer peripheral surfaces 51A, 52A and the second inner peripheral surfaces 21B, 22B.

Figure 5:
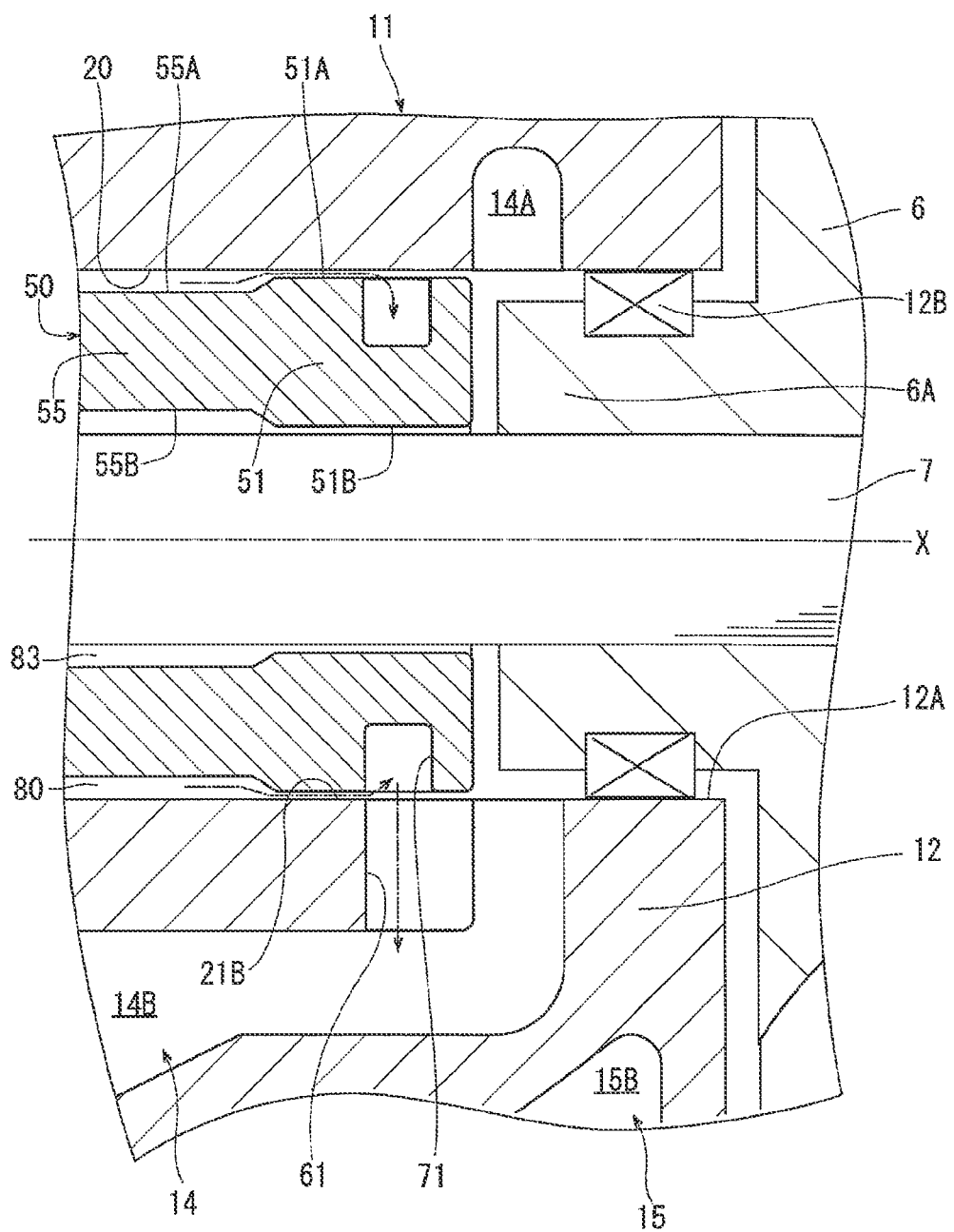
FIG. 5 is an enlarged cross-sectional view of a part of the turbocharger according to the first embodiment.

As shown in FIGS. 3 to 5, a recovery groove 71 extending all the way around the bearing portion in the circumferential direction is formed in the first outer peripheral surface 51A on the turbine wheel 6 side. The recovery groove 71 has a cross section of a nearly rectangular shape and its depth is set to a value sufficiently deeper than the gap between the first outer peripheral surfaces 51A, 52A and the second inner peripheral surfaces 21B, 22B.

As shown in FIGS. 4 and 5, the first inner peripheral surfaces 51B, 52B have the diameter slightly larger than that of the rotor shaft 7. This allows a lubricant oil film to be formed between the first inner peripheral surfaces 51B, 52B and the rotor shaft 7. A plurality of guide grooves 77 are formed in each of the first inner peripheral surfaces 51B, 52B. Each guide groove 77 extends in a direction parallel to the shaft center X from the intermediate portion 55 and ends in the middle of the first inner peripheral surface 51B, 52B or at an end of the semi-floating bearing 50. The guide grooves 77 are equally spaced around the shaft center X. The illustration is omitted for the guide grooves 77 formed in the first inner peripheral surface 52B on the compressor wheel 8 side.

As shown in FIG. 2, an outer peripheral surface 55A of the intermediate portion 55 has the diameter smaller than that of the first outer peripheral surfaces 51A, 52A. An outside oil feed chamber 80 being a space of a nearly cylindrical shape is formed between the outer peripheral surface 55A and the bearing chamber 20 in the bearing housing 11. A first oil feed passage 81 downwardly penetrating the bearing housing 11 from the top surface to be connected to the outside oil feed chamber 80 is formed in the bearing housing 11. An unillustrated oil feed pipe is connected to the top end of the first oil feed passage 81. This allows the first oil feed passage 81 to supply the lubricant oil to the outside oil feed chamber 80.

The inner peripheral surface 55B of the intermediate portion 55 has the diameter larger than that of the first inner peripheral surfaces 51B, 52B. In the intermediate portion 55, an inside oil feed chamber 83 being a space of a nearly cylindrical shape is formed between the inner peripheral surface 55B and the rotor shaft 7. A second oil feed passage 82 radially penetrating the intermediate portion 55 from the outer peripheral surface 55A to the inner peripheral surface 55B is formed in the intermediate portion 55. The second oil feed passage 82 makes the outside oil feed chamber 80 communicated with the inside oil feed chamber 83.

In the intermediate portion 55, a regulatory hole 55C is formed so as to radially penetrate the intermediate portion 55. In the bearing housing 11, a regulatory pin 20A is provided so as to project from the inner peripheral surface of the bearing chamber 20 toward the intermediate portion 55. The regulatory pin 20A is inserted in the regulatory hole 55C, whereby the semi-floating bearing 50 is regulated so as not to move in the direction of the shaft center X and rotate around the shaft center X.

As shown in FIGS. 2, 4, and 5, a discharge passage 61 is formed in the bearing housing 11. The discharge passage 61 is formed in a groove form by downwardly cutting a part of the bearing housing 11. The top end of the discharge passage 61 has an opening in the second inner peripheral surface 21B on the turbine wheel 6 side of the bearing chamber 20 to be opposed to the recovery groove 71 from bottom and be communicated with the lower end of the recovery groove 71. The bottom end of the discharge passage 61 is connected to the second space 14B of the oil jacket 14.

The turbocharger 1 is mounted on an unillustrated engine. During an operation of the engine, as shown in FIG. 1, the exhaust introduced from exhaust ports of cylinders of the engine into the turbine housing 16 drives the turbine wheel 6 to rotate the turbine wheel 6, the rotor shaft 7, and the compressor wheel 8 together around the shaft center X. On the other hand, the intake air introduced into the compressor housing 18 is compressed by the compressor wheel 8 to be supercharged into the cylinders. The supercharged intake air into the cylinders is further compressed, ignited, and exploded and thereafter becomes the exhaust to drive the turbine wheel 6 in the turbine housing 16.

In the turbocharger 1, as shown in FIG. 2, the lubricant is supplied at a predetermined supply pressure through the unillustrated oil feed pipe to the first oil feed passage 81. Then the lubricant is supplied through the outside oil feed chamber 80 to the first outer peripheral surfaces 51A, 52A of the respective bearing portions 51, 52 of the semi-floating bearing 50. This causes a uniform oil film to be formed between the first outer peripheral surfaces 51A, 52A and the second inner peripheral surfaces 21B, 22B of the bearing chamber 20. The lubricant in the first oil feed passage 81 is also supplied through the second oil feed passage 82, the inside oil feed chamber 83, and the guide grooves 77 (cf. FIGS. 3 and 4) to the first inner peripheral surfaces 51B, 52B of the respective bearing portions 51, 52. This causes a uniform oil film to be formed between the first inner peripheral surfaces 51B, 52B and the rotor shaft 7 as well. As a result of these, the semi-floating bearing 50 can rotatably support the rotor shaft 7 well.

Temperature maintenance and lubrication in the bearing housing 11 are appropriately carried out by discharge of the lubricant by the oil jacket 14 and circulation of cooling water by the water jacket 15.

The lubricant supplied to the first outer peripheral surfaces 51A, 52A is subjected to the supply pressure from the first oil feed passage 81 side, to move toward the turbine wheel 6 and toward the compressor wheel 8. In the turbocharger 1, as shown in FIG. 5, the lubricant supplied to the first outer peripheral surface 51A flows into the recovery groove 71, whereby the supply pressure is relieved. Then the lubricant in the recovery groove 71 moves downward along the recovery groove 71 by gravity, as shown in FIG. 4. The lubricant downwardly moving along the recovery groove 71 is guided into the discharge passage 61 to be discharged downward, as shown in FIGS. 4 and 5.

In the turbocharger 1, the recovery groove 71 and the discharge passage 61 keep the lubricant supplied to the first outer peripheral surface 51A, less likely to be scattered along the rotor shaft 7. For this reason, the lubricant supplied to the first outer peripheral surface 51A is prevented from coming into contact with the base 6A of the turbine wheel 6 and others rotating together with the rotor shaft 7. Therefore, the lubricant supplied to the first outer peripheral surface 51A can be prevented from being scattered over a wide range by centrifugal force with rotation of the base 6A and others. As a result, the turbocharger 1 is configured so that the lubricant can be kept from being scattered over a wide range and from leaking through the seal member 12B into the exhaust flowing on the turbine wheel 6 side, because of negative pressure of the exhaust.

Accordingly, the turbocharger 1 achieves the improvement of oil-sealing properties.

Since in the turbocharger 1 the bearing housing 11 has the bearing chamber 20, oil jacket 14, and water jacket 15, the bearing housing 11 has the complicated shape. For this reason, the bearing housing 11 is manufactured by employing complicated steps of forming the contour and inner spaces by molding with cores and thereafter performing partial cutting. Since the recovery groove 71 is not formed in the bearing housing 11 but formed in the first outer peripheral surface 51A of the bearing portion 51 in the semi-floating bearing 50, it can reduce the complexity of the manufacturing steps of the bearing housing 11 (housing 10). This can avoid a rise of manufacturing cost of the turbocharger 1.

(Second Embodiment)

Figure 6:
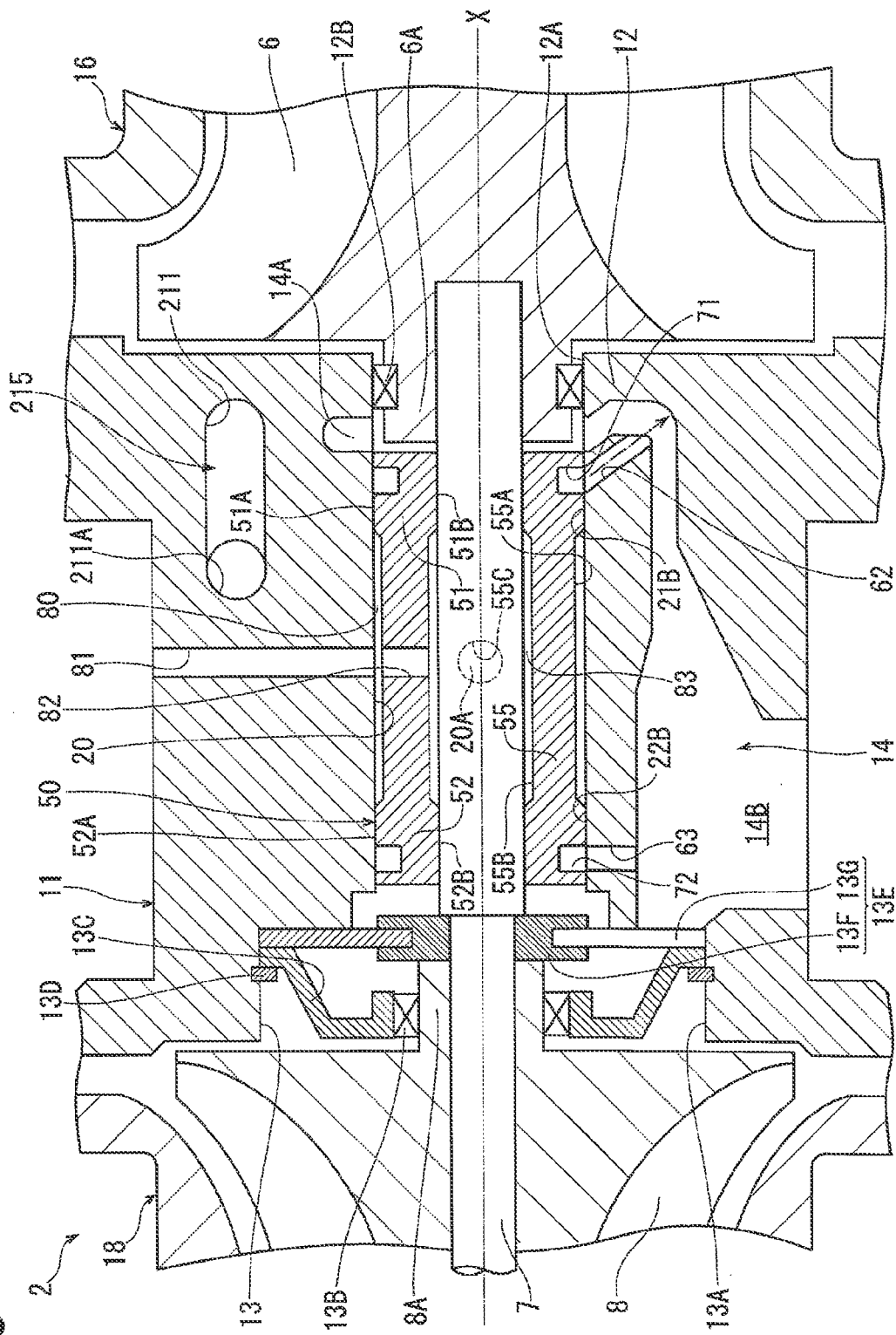
FIG. 6 is an enlarged cross-sectional view of a part of the turbocharger according to the second embodiment.
Figure 7:
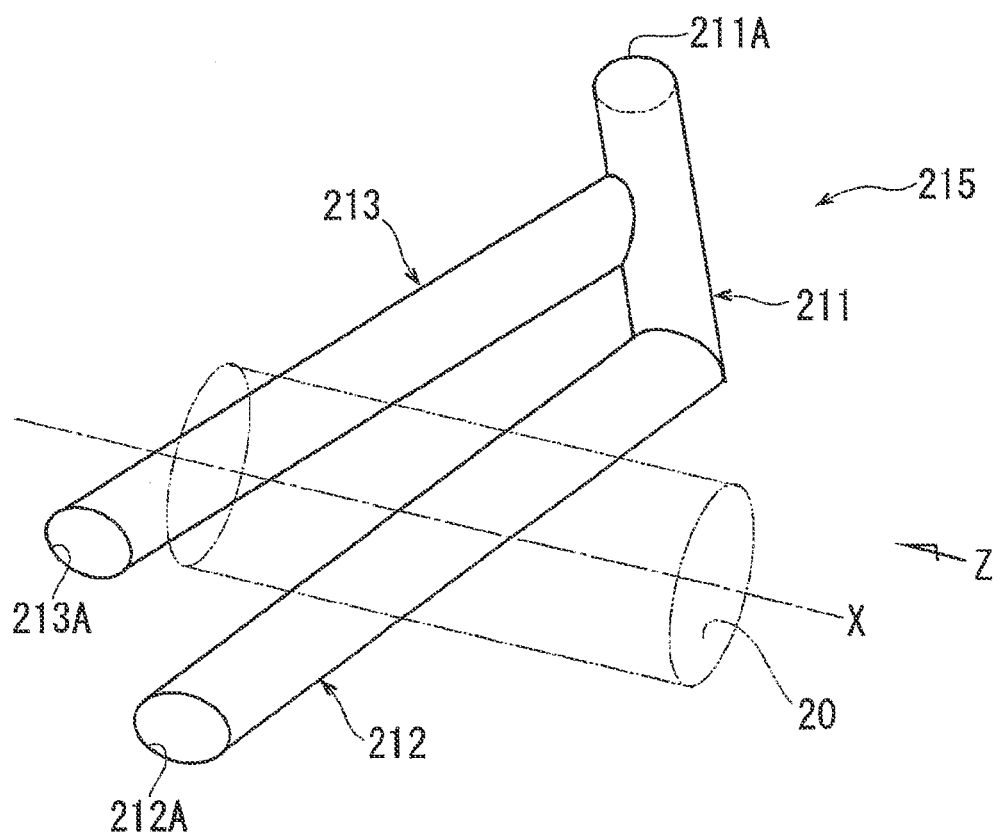
FIG. 7 is a perspective view showing a water jacket and a bearing chamber in the turbocharger according to the second embodiment.
Figure 8:
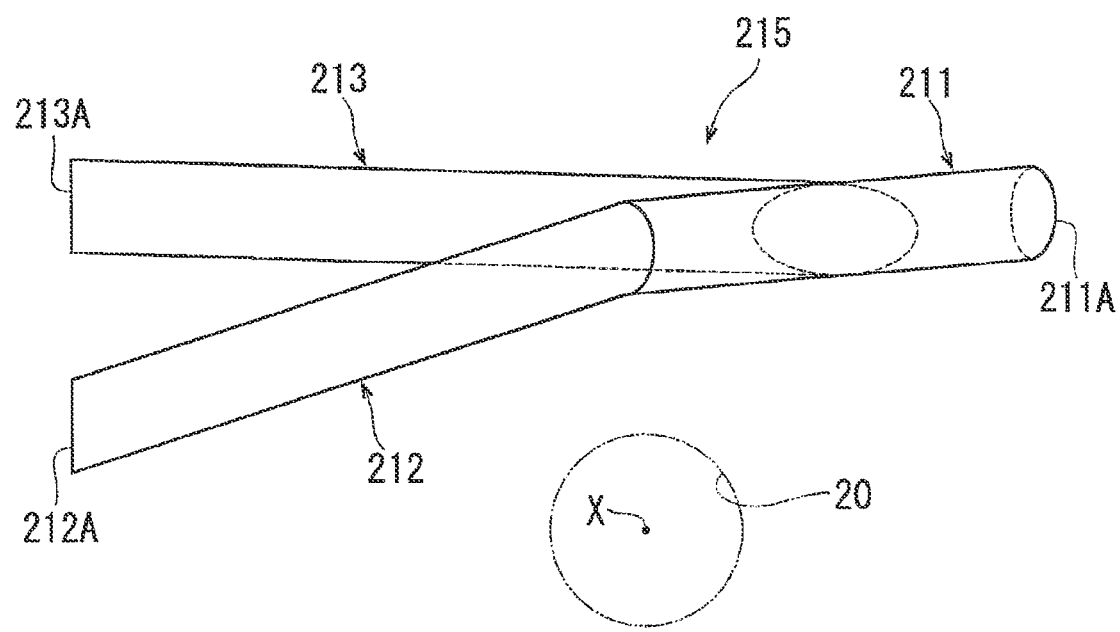
FIG. 8 is a view of the water jacket and the bearing chamber from the Z-direction shown in FIG. 7.

As shown in FIGS. 6 to 8, the turbocharger 2 of the second embodiment employs a discharge passage 62 and a water jacket 215, instead of the discharge passage 61 and the water jacket 15 in the turbocharger 1 of the first embodiment. In the turbocharger 2, a recovery groove 72 and a discharge passage 63 are provided on the compressor wheel 8 side. The other configuration is the same as that of the turbocharger 1.

In the turbocharger 2, as shown in FIG. 6, the discharge passage 62 is formed on the turbine wheel 6 side of the bearing chamber 20 in the bearing housing 11. The discharge passage 62 penetrates the bearing housing 11 obliquely downward so as to become closer to the part of the compartment wall 12 located below the shaft center X, whereby it is formed in a thin hole form. The upper end of the discharge passage 62 has an opening in the second inner peripheral surface 21B on the turbine wheel 6 side to be opposed to the recovery groove 71 from bottom and communicated with the lower end of the recovery groove 71. The lower end of the discharge passage 62 has an opening in a connection between the first space 14A and the second space 14B in the oil jacket 14.

The recovery groove 72 extending all the way around the bearing portion in the circumferential direction is formed in the first outer peripheral surface 52A on the compressor wheel 8 side. Since the recovery groove 72 has the same configuration as the recovery groove 71, the detailed description thereof is omitted herein.

The discharge passage 63 of a thin hole shape is formed on the compressor wheel 8 side of the bearing chamber 20 in the bearing housing 11. The upper end of the discharge passage 63 has an opening in the second inner peripheral surface 22B on the compressor wheel 8 side to be opposed to the recovery groove 72 from bottom and communicated with the lower end of the recovery groove 71. The discharge passage 63 vertically extends downward. The lower end of the discharge passage 63 has an opening in the second space 14B of the oil jacket 14.

The water jacket 215 is formed near the part of the compartment wall 12 located above the shaft center X. As shown in FIGS. 7 and 8, the water jacket 215 is composed of a plurality of drilled holes 211, 212, and 213. The drilled holes 211, 212, 213 are formed by drilling from the outside of the bearing housing 11 so that their respective tip ends are communicated with each other. The illustration of the bearing housing 11 is omitted in FIGS. 7 and 8, but an aperture 211A of the drilled hole 211 opens in one side face (on the far side with respect to the plane of FIG. 6) of the bearing housing 11 shown in FIG. 6. Apertures 212A, 213A of the drilled holes 212, 213 shown in FIGS. 7 and 8 open in the other side face (on the near side with respect to the plane of FIG. 6) of the bearing housing 11 shown in FIG. 6.

The turbocharger 2 also achieves the same operational effect as the turbocharger 1. Namely, in the turbocharger 2, the lubricant is prevented from being scattered over a wide range and from leaking through the seal member 12B into the exhaust flowing on the turbine wheel 6 side, because of negative pressure of the exhaust.

In the turbocharger 2, the recovery groove 72 and the discharge passage 63 provided on the compressor wheel 8 side keep the lubricant from leaking through the seal member 13B into the intake air flowing on the compressor wheel 8 side.

Therefore, the turbocharger 2 also achieves the improvement of oil-sealing properties.

Since the recovery groove 72 is not formed in the bearing housing 11 but formed in the first outer peripheral surface 52A of the bearing portion 52 in the semi-floating bearing 50, it can reduce the complexity of the manufacturing steps of the bearing housing 11 (housing 10). This can avoid a rise of manufacturing cost of the turbocharger 2.

In the turbocharger 2, the lubricant discharged from the discharge passage 62 comes into contact with the portion of the compartment wall 12 located below the shaft center X on the turbine wheel 6 side, which will be raised to high temperature, to cool the portion. For this reason, the portion located below the seal member 12B and others are cooled, and for this reason, the portion of the compartment wall 12 located below the shaft center X is less needed to be cooled by the water jacket 215. The water jacket 215 can be located near the portion located above the shaft center X and formed so as not to extend to below the shaft center X of the compartment wall 12. This allows the water jacket 215 to be formed by drilling after casting, as shown in FIGS. 7 and 8, instead of being formed with cores during casting. As a result, the turbocharger 2 realizes simplification of manufacturing steps of the bearing housing 11 and reduction of manufacturing cost.

Namely, the region in contact with the lubricant in the compartment wall 12 becomes less needed to be cooled by the water jacket 215, so that the water jacket 215 formed in that region can be made smaller or eliminated. As a result, the turbocharger 2 of the second embodiment realizes simplification of the manufacturing steps of the bearing housing 11 (housing 10) and reduction of manufacturing cost.

The present invention is by no means limited to the above first and second embodiments, but can be applied with appropriate modification without departing from the scope and spirit of the invention.

Figure 9:
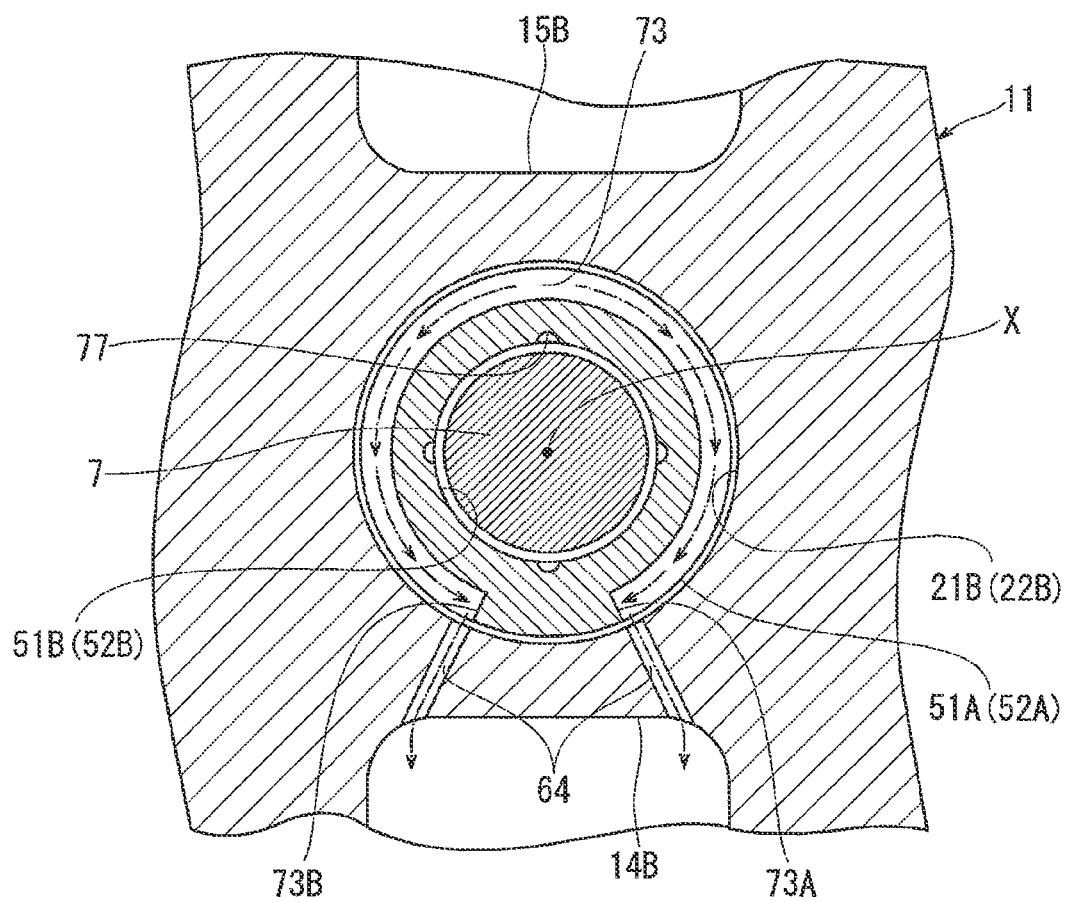
FIG. 9 is a cross-sectional view showing a modification example of the turbochargers according to the first and second embodiments.

For example, as shown in FIG. 9, a recovery groove 73 may be formed, without extending all the way around the bearing portion in the circumferential direction of the first outer peripheral surface 51A, 52A, in such a manner that discharge passages 64 are connected to respective lower ends 73A, 73B of the recovery groove 73. In this case, the improvement of oil-sealing properties is also achieved. It is often the case in the turbocharger with the semi-floating bearing that, particularly, before the lubricant in the upper part drops by gravity, the lubricant is scattered over a wide range by centrifugal force with rotation of the rotating member and the lubricant leaks through the seal member into the exhaust flowing on the turbine wheel side, because of negative pressure of the exhaust. For preventing it, the recovery groove 73 extends in the region of at least the upper half of the first outer peripheral surface 51A, 52A and the discharge passages 64 are connected to the respective lower ends 73A, 73B of the recovery groove 73, which can achieve the improvement of oil-sealing properties. FIG. 9 is a cross-sectional view showing a configuration of the turbocharger of the present modification example cut in the same cross section as FIG. 4.

The number and directions of drilled holes forming the water jacket 215 are not limited to the configuration disclosed in the second embodiment. For example, the drilled hole 213 does not always have to be formed. Any one of the apertures 211A, 212A, 213A of the drilled holes 211, 212, 213 may be closed with a plug. Particularly, when the aperture 211A of the drilled hole 211 is closed by a metal ball valve or the like, a flange part of the water jacket 215 can be formed on the other side face of the bearing housing 11 only.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:
1. A bearing structure of a turbocharger comprising:
a housing having a bearing housing in which a bearing chamber is formed;
a rotor shaft to which a turbine wheel and a compressor wheel are coupled; and
a semi-floating bearing arranged in the bearing chamber and rotatably supporting the rotor shaft,
wherein the semi-floating bearing has a pair of bearing portions located at two longitudinal ends and an intermediate portion connecting the two bearing portions, the intermediate portion having a smaller diameter than a diameter of each of the bearing portions,
wherein an outer peripheral surface of the intermediate portion and an inner peripheral surface of the bearing chamber constitute an outside oil feed chamber which supplies a lubricant oil to outer peripheral surfaces of the pair of bearing portions, wherein a groove extending in a circumferential direction is formed in the outer peripheral surface of at least one of the bearing portions, and wherein an oil feed passage connecting to the outside oil feed chamber and a discharge passage opposed to the groove, opened to the inner peripheral surface of the bearing chamber, and configured to discharge the lubricant oil in the groove downward are formed in the bearing housing, wherein an upper end of the discharge passage directly faces a bottom end of the groove.

2. The bearing structure of the turbocharger according to claim 1, wherein the groove is formed so as to extend all the way around the bearing portion in the circumferential direction.

3. The bearing structure of the turbocharger according to claim 1, wherein the housing has a compartment wall located between the bearing chamber and the turbine wheel, wherein the groove is formed at least in the outer peripheral surface of the bearing portion located on the turbine wheel side, and wherein the discharge passage is formed so that the lubricant oil comes into contact with the compartment wall.

4. The bearing structure of the turbocharger according to claim 1, wherein an inner peripheral surface of the intermediate portion and an outer peripheral surface of the rotor shaft constitute an inside oil feed chamber connecting to inner peripheral surfaces of the pair of bearing portions, and wherein an oil feed passage connecting to the inside oil feed chamber is formed in the semi-floating bearing.

5. A bearing structure of a turbocharger comprising:

a housing having a bearing housing in which a bearing chamber is formed;

a semi-floating bearing housed in the bearing chamber; and a rotor shaft which is rotatably supported on the semi-floating bearing in the bearing chamber and to which a turbine wheel and a compressor wheel are coupled, wherein the semi-floating bearing has a pair of bearing portions formed at two longitudinal ends and an intermediate portion connecting the two bearing portions, the intermediate portion having a smaller diameter than a diameter of each of the bearing portions, wherein a first outer peripheral surface of a cylindrical shape and a first inner peripheral surface arranged coaxially with the first outer peripheral surface and rotatably supporting the rotor shaft are formed in each of the two bearing portions, wherein an outside oil feed chamber located between the bearing housing and the intermediate portion, a first oil feed passage connecting to the outside oil feed chamber, and a second inner peripheral surface supporting both of the first outer peripheral surfaces are formed in the bearing housing, wherein an inside oil feed chamber located between the intermediate portion and the rotor shaft, and a second oil feed passage to make the outside oil feed chamber communicated with the inside oil feed chamber are formed in the intermediate portion, wherein a groove extending in a circumferential direction is formed in at least one of the first outer peripheral surfaces, and wherein a discharge passage opposed to the groove and configured to discharge a lubricant oil in the groove downward is formed in the bearing housing, wherein an upper end of the discharge passage directly faces a bottom end of the groove.

6. The bearing structure of the turbocharger according to claim 5, wherein the groove is formed so as to extend all the way around the bearing housing in the circumferential direction.

7. The bearing structure of the turbocharger according to claim 5, wherein the housing has a compartment wall located between the bearing chamber and the turbine wheel, wherein the groove is formed at least in the first outer peripheral surface of the bearing portion located on the turbine wheel side, and wherein the discharge passage is formed so that the lubricant oil comes into contact with the compartment wall.

* * * * *